United States Patent Office 2,830,037

Patented Apr. 8, 1958

1

2,830,037

POLY (POLYALKYLENE ETHER URETHANES)

Albert S. Carter, New Castle, Del., assignor to E. I. du Pont de Nemours and Company, Wilmington, Del., a corporation of Delaware No Drawing. Application June 30, 1953
Serial No. 365,283

6 Claims. (Cl. 260—77.5)

This invention relates to an improved process for the manufacture of elastomers in which a polytetramethylene ether glycol is condensed with 2,4-tolylene diisocyanate and with water or other chain extending agent. The invention relates more particularly to carrying out the reaction in an inert organic solvent in which the resultant elastomer is insoluble.

In the manufacture of elastomers of this type, the reaction between the polytetramethylene ether glycol, the 2,4-tolylene diisocyanate and the water yields a reaction mass which is very difficult to handle, for as the reaction progresses the mass becomes very tough and rubbery. Because of the consistency of the reaction mass, heavy duty mixing equipment is required and difficulty is experienced in controlling the temperature of the reaction. While in the production of other types of elastomers solvent polymerization is often employed, such solvent processes also present difficulties in large scale operation, such as recovery of the solvent and separation of the solvent from the polymer while leaving the polymer in satisfactory physical form for subsequent working, which usually requires special types of stills or evaporating apparatus.

It is an object of the present invention to provide a simple and economical process for carrying out the condensation of polytetramethylene ether glycol and 2,4-tolylene diisocyanate, and the further extension of the condensation polymer with water or other extending agent by a process which does not require heavy mixing equipment. It is a further object of the invention to provide a process wherein the final extension of the product is carried out in an inert organic solvent in which the resultant elastomer is relatively insoluble.

I have found that, where the polytetramethylene ether glycol and 2,4-tolylene diisocyanate are reacted in an organic solvent, preferably a hydrocarbon solvent of from 6 to 12 carbon atoms, a syrupy dispersed prepolymer forms which on further reaction with water or other chain extending agent produces an elastomer which settles out of the dispersion in a form readily recoverable by decantation or filtration and from which the residual solvent can readily be removed. While the polytetramethylene ether glycol is not soluble in the hydrocarbon solvent at room temperature, it goes into solution on warming and by further heating the solution the small amount of water present in the ether glycol can be azeotropically distilled off, leaving an anhydrous solution. To this anhydrous solution the required amount of 2,4-tolylene diisocyanate is then added under agitation, giving the reaction product which we refer to as the prepolymer. Upon the addition of water or other chain extender to this solution under good agitation, a solid polymer begins to separate usually in the form of small beads. When the formation of the polymer has been completed, these beads may be filtered off from the solvent and the solvent adhering to the beads may be removed by heating either on a rubber mill or in a Banbury mixer, etc. The solvent may be reused in this process without further purification. Alternatively, the polytetramethylene ether glycol, the 2,4-tolylene diisocyanate and the water may be mixed together initially, and the reaction of the polytetramethylene ether glycol and the 2,4-tolylene diisocyanate takes place in the presence of the water with the water combining in the molecule as a chain extender.

2

It is of course not necessary in all cases to carry out the condensation reaction of the polytetramethylene ether glycol with the 2,4-tolylene diisocyanate in an inert organic solvent since this prepolymer is usually a viscous liquid. The inert organic solvent may be added after the formation of the prepolymer so that during the addition of water or other extender a readily workable mass is obtained. The use of the inert organic solvent at the start of the reaction, however, provides an easy method for dehydrating the polytetramethylene ether glycol prior to condensation and simplifies carrying out the reaction.

The aliphatic hydrocarbon solvents particularly useful in this process are those which are liquid at room temperature but which preferably do not boil below 100° C. since the reaction is frequently carried out at temperatures of up to 95° C. or above. If the reaction is carried out in closed equipment under pressure, quite obviously lower boiling hydrocarbon solvents may be used. Any inert solvent having physical properties as above set forth may be used in this process provided the reaction products have sufficient solubility therein and in which the final elastomer is insoluble. Particularly suitable are n-heptane, n-octane, n-nonane, n-dodecane, as well as isomers and mixtures of these hydrocarbons which may be obtained from naturally obtained petroleum sources such as kerosene, or from synthetically prepared hydrocarbons. Cycloaliphatic hydrocarbons which can be evaporated from the resulting elastomer but in which the elastomer is insoluble, may also be employed.

The polytetramethylene ether glycol which has the general formula: $H(O—C_4H_8—O—C_4H_8—)_n—OH$ should have a molecular weight of at least 750 to assure the formation of elastomeric polymers. In general, polymers having a molecular weight of between 2000 and 4000 will be employed.

The preparation of elastomers from polytetramethylene ether glycol and 2,4-tolylene diisocyanate wherein the reaction is carried out in the massive form, is more particularly described in copending application of Frederick B. Hill, Jr., Serial No. 365,270, filed of even date herewith.

After the formation of the prepolymer which is the reaction product of the polytetramethylene ether glycol and 2,4-tolylene diisocyanate, water is added to effect what is generally considered to be an extension of the polymer chain to give a product which is a curable elastomer.

The molar ratio of 2,4-tolylene diisocyanate to the polytetramethylene ether glycol should be within the range of 1.2:1 to 12:1 and preferably from 1.2:1 to about 5:1. If larger amounts of the diisocyanate are used, the products tend to be more plastic or resinous. If lesser amounts are used, the proportion of urethane groups formed by the reaction of the —NCO groups with —OH to urea groups formed by the reaction of —NCO groups with the water added is too large. This causes difficulties in subsequent curing with diisocyanate compounds. While the mechanism of the curing is not known for certain, it appears that the cross-linking reaction through which the linear chains are united to form the elastomer takes place much more readily on urea nitrogens than on urethane nitrogens.

The amount of water added to act primarily as a chain extender in this process is somewhat greater than that ordinarily used in the non-solvent or massive processes. An advantage of this process is that it is not as sensitive to the amount of water used. In the present process from about 1 to about 4 mols of water per mol of diisocyanate are employed. This is considerably in excess of the quantity demanded by theory which is one-half mol of water per mol of diisocyanate which has one —NCO group reacted with an —OH group of the polyalkylene ether glycol. Any free diisocyanate of course requires one mol of water per mol of diisocyanate.

The time of reaction varies with the temperature. At room temperature reaction times of up to about 72 hours may be required for the completion of the reaction of the diisocyanate with the polytetramethylene ether glycol, whereas at temperatures of 100° to 120° C. only about 1 hour is required. The time required for the formation of the elastomer by the reaction of the prepolymer with water requires about 40 hours at room temperature, while at about 90° to 100° C. only about 1 to 2 hours is required. In all cases the reaction with water should be stopped while the product is still millable.

By the use of a solvent in carrying out the reaction a more uniform polymer is obtained than where the final plastic rubbery mass is mixed in heavy duty milling apparatus. Much better temperature control of the reaction is possible since the reaction is being carried out in a readily agitated liquid system. The ease of isolation of the resulting elastomer is readily apparent since it requires only a simple filtration. The resulting products appear to be more stable to storage than the corresponding elastomer produced in the absence of a solvent although it is necessary to stabilize these materials by the addition of a stabilizer if they are to be stored for an extended period of time. The elastomer, however, is sufficiently stable so that further processing of the polymer can be carried out in normal operations without precuring. This process requires less expensive equipment than where it is carried out in the absence of a solvent, and obviously appreciably less power is required.

The following examples are given to illustrate the invention. The parts used are by weight.

*Example 1*

(A) Into a glass lined reaction vessel equipped with a stirrer, thermometer and a water trap were placed 210 parts of normal octane and 50 parts of a polytetramethylene ether glycol of average molecular weight 3890. This mixture was heated and when the glycol was melted the agitation was started. The solution was gradually heated to 127° C. where the water which was present in the polyether glycol as an impurity was azeotropically distilled out. A total of 32 parts of the azeotropic mixture was thus removed. The temperature of the solution of the polyether glycol in octane was then adjusted to 115° C. and 6.6 parts of 2,4-tolylene diisocyanate were added to the flask. The reaction mixture was stirred for 1½ hours while the temperature gradually dropped to about 95° C. At this time there was an insoluble phase in the N-octane solution. Then there was added 1 part of water and the temperature was maintained at 90° to 95° C. while stirring was continued for ½ hour. At the end of this time an additional 0.5 part of water was added and the mixture was stirred for 7 hours at from 90° to 95° C. During this time an accumulation of small plastic solid beads formed in the solvent. The material was removed from the flask and filtered. The polymer beads were transferred to a rubber mill and were milled for ½ hour at 135° C. A smooth band which was free of both solvent and water was thus formed.

The polymer was cured by putting 100 parts of the product on a rubber mill and forming a sheet, into which is milled at 70° to 80° C. for 10 to 15 minutes 8 parts of dimer of 2,4-tolylene diisocyanate. This material was then pressed in a mold and cured for 1 hour at 132° C. The tensile strength of the resulting polymer was 5800 pounds per square inch. The elongation at the break was 550% and the 300% modulus was 1000 pounds per square inch. The ratio of polyether glycol to diisocyanate to water molar ratio in this example was 1:2.95:6.5.

(B) This process was repeated with the addition to the n-octane at the start of 4 parts of the copolymer of 10% beta-diethylaminoethylmethacrylate with 90% technical lauryl methacrylate which is surface active in hydrocarbon systems and acted to help disperse the polytetramethylene glycol and the reaction product of the diisocyanate and the polyglycol. The polyglycol is soluble in the n-octane at elevated temperatures but the diisocyanate reaction product is insoluble both hot and cold. The product obtained was, to all appearances, identical with that obtained in 1–A.

*Example 2*

The process of this example was carried out in the equipment and in the same manner as that used in Example 1. 140 parts of normal octane were used as the solvent, to which 50 parts of polytetramethylene ether glycol of average molecular weight 3890 was then added, azeotropically distilled to eliminate the water present and then 6.6 parts of 2,4-tolylene diisocyanate were added. After heating for 1 hour at from 95° to 115° C., there were added in one portion 1.5 parts of water. (The mol ratio of polytetramethylene ether glycol to diisocyanate to water in this example is 1:2.95:6.5.) After the addition of the water, stirring was continued and heating was discontinued. The temperature was allowed to drop and reach room temperature. Stirring was continued for a total of 6 hours. The insoluble plastic beads were then filtered from the normal octane solution and dried on a rubber mill at about 130° to 135° C. 100 parts of this dry material were then banded on a rubber mill and 6 parts of dimer of 2,4-tolylene diisocyanate were milled into the mixture at 100° C. A portion was then cured in a press for 45 minutes at 130° C. A smooth resilient slab was obtained which tests showed had a tensile strength at the break of 6000 pounds per square inch, elongation at the break of 550%, and modulus at 300% elongation of 900 pounds per square inch.

*Example 3*

This example was carried out as in Example 2 except that the formation of the prepolymer, that is the reaction of the polytetramethylene ether glycol and diisocyanate, was allowed to take place over a long time and at room temperature while the reaction with water was carried out at an elevated temperature for a relatively short time. 140 parts of normal octane were used in which 50 parts of polytetramethylene ether glycol of average molecular weight 3890 were azeotropically dried as in Example 1. Then 6.6 parts of 2,4-tolylene diisocyanate were added and stirred at room temperature for 72 hours. A thin fluid mass resulted. The mixture was then heated to 95° C. and 1.5 parts of water were added and stirring continued for 1 hour and 40 minutes at this temperature. The insoluble beads were then filtered off of the normal octane. Some time later they were dried on a rubber mill at about 130° to 135° C. 100 parts of this dried material were then banded on a rubber mill and 6 parts of the dimer of 2,4-tolylene diisocyanate were blended in at 100° C. over 10 to 15 minutes. A portion was then cured for 45 minutes at 132° C. The rubber-like material which resulted from this curing showed a tensile strength at the break of 3100 pounds per square inch, elongation at the break of 400%, and modulus at 300% elongation of 1000 pounds per square inch.

*Example 4*

This example was carried out as in Example 2 except that both the formation of the prepolymer and the extension with water were carried out at room temperature. 140 parts of normal octane were used as the solvent and to this were added 50 parts of polytetramethylene ether glycol of average molecular weight 3890. After the azeotropic drying of this material it was cooled to room temperature and 6.6 parts of 2,4-tolylene diisocyanate were added and the mixture stirred for 72 hours. At the end of this time 1.5 parts of water were added and the mixture was stirred 8½ hours at room temperature. The insoluble beads were filtered off and dried on a rubber mill as before. After curing as in Example 2, samples of rubbery material showed a tensile strength at the break of 4800 pounds per square inch, elongation at the break of 500%, and modulus at 300% elongation of 1200 pounds per square inch.

*Example 5*

Into a glass lined reaction vessel of Example 1 were placed 370 parts of a mixture of saturated aliphatic hydrocarbons boiling in the range of 101° to 145° C. To this mixture were added 50 parts of a polytetramethylene ether glycol of average molecular weight 2800. This glycol was dried azeotropically as in Example 1. The mixture was cooled to 115° C. and then 8.7 parts of 2,4-tolylene diisocyanate were added and the mixture was stirred and heated at 115° C. for 1 hour. The prepolymer separates as a liquid insoluble phase which is readily stirred into a thin fluid mass. The mass was allowed to cool to room temperature while stirring, and then there were added 2 parts of water. The total time of stirring at room temperature was 16 hours. (The molar ratio of polytetramethylene ether glycol to diisocyanate to water in this example is 1:2.95:6.5.) The insoluble grains of polymer were filtered off of the solvent and dried on a rubber mill at about 130° C. To 100 parts of the polymer so dried were added 10 parts of the dimer of 2,4-tolylene diisocyanate which were blended in on a rubber mill at 80° C. for 10 to 15 minutes and then a portion was cured for 60 minutes at 132° C. The rubbery material obtained from this curing showed a tensile strength at the break of 3600 pounds per square inch, elongation at the break of 400%, and modulus at 300% elongation of 2000 pounds per square inch.

*Example 6*

340 parts of normal heptane were placed in the reactor of Example 1 and 50 parts of polytetramethylene ether glycol of average molecular weight 2800 were added. After azeotropically drying this material, there were added 7.2 parts of 2,4-tolylene diisocyanate at 95° C. and the mixture was stirred at this temperature for 1 hour. The mass was allowed to cool and there were then added 1.26 parts of water. The mixture was stirred for 19 hours at room temperature. (The molar ratio of polytetramethylene ether glycol to diisocyanate to water in this example is 1:2.3:3.9.) After the stirring at room temperature had been completed, the insoluble granules were separated from the normal heptane and the residual normal heptane was removed on a hot rubber mill. 100 parts of this material were homogenized on a rubber mill at 70° C. with 10 parts of the dimer of 2,4-tolylene diisocyanate and then cured as in Example 1. The rubbery material thus obtained showed a tensile strength at the break of 4800 pounds per square inch, elongation at the break of 500%, and modulus at 300% elongation of 1300 pounds per square inch.

*Example 7*

To 340 parts of normal heptane were added 50 parts of a polytetramethylene ether glycol of average molecular weight 2800 and the water in the system was azeotropically removed. There were then added 15.66 parts of 2,4-tolylene diisocyanate at 95° C. and the mixture was stirred for 1 hour, at the end of which time the insoluble prepolymer had separated and formed a thin readily stirrable mass. The mass was then allowed to cool and 4 parts of water were added. Stirring at room temperature was then continued for 19 hours. (The molar ratio of polytetramethylene ether glycol to diisocyanate to water in this example is 1:5:12.) The insoluble granules were then removed from the normal heptane and dried on the rubber mill as in Example 6. 100 parts of this were then homogenized with 5 parts of the dimer of 2,4-tolylene diisocyanate at 70° C. and cured as in Example 1. The properties of the rubbery material thus obtained were as follows: Tensile strength at the break 5100 pounds per square inch; elongation at the break 500%; and modulus at 300% elongation 1700 pounds per square inch.

*Example 8*

To 350 parts of normal octane were added 50 parts of a polytetramethylene ether glycol of average molecular weight 3980. The water present in the system was then azeotropically distilled until 35 parts of azeotropic composition had been collected. It was then allowed to cool to room temperature. At this temperature 0.25 part of water and 5.0 parts of 2,4-tolylene diisocyanate were added and the mixture was stirred at room temperature for 30 minutes. The mixture was then heated slowly and uniformly over the next 45 minutes to 60° C., then to 70° C. over a period of 10 minutes, then held at 70° C. for 50 minutes. The temperature was then gradually and uniformly raised over the next 40 minutes to 100° C. and then the heating was continued slowly so that 130 minutes later it was 120° C. The temperature was maintained at 120° C. for 39 hours, then the heating discontinued and the product allowed to cool. The solvent was decanted and the product milled for 30 minutes at 100° C. to remove occluded solvent. In this condition it was a smooth, banded, rubbery-looking material. It was then compounded with 10 parts of the dimer of 2,4-tolylene diisocyanate per 100 parts of the product at 60° to 70° C. A sample was then cured for 1 hour at 132° C. under pressure. The rubbery homogeneous slab which resulted from this molding showed the following properties: Tensile strength at the break 4000 pounds per square inch; elongation at the break 500%; and modulus at 300% elongation 900 pounds per square inch.

*Example 9*

50 parts of polytetramethylene ether glycol of average molecular weight 2800 is stirred with 15.66 parts of 2,4-tolylene diisocyanate at 95° C. for one hour. To the syrupy prepolymer thus formed is added 340 parts of n-heptane. The thin, readily stirrable mass is cooled to room temperature under continued agitation and 4 parts of water are added. Agitation is continued for 19 hours at room temperature (the molar ratio of polytetramethylene ether glycol to diisocyanate to water in this example is 1:5:12). The insoluble granules which separate from the n-heptane are removed and dried by milling on a hot rubber mill at about 130° C. 100 parts of this product are then homogenized with 5 parts of the dimer of 2,4-tolylene diisocyanate on the mill and cured as in Example 1. A smooth, rubbery polymer of good tensile strength is obtained.

*Example 10*

Into a reaction flask were placed 420 parts of normal octane. The solvent was heated to 70° C. and then 100 parts of polytetramethylene oxide glycol with average molecular weight 1200 were added. The heating was continued until the boiling temperature of 127° C. was reached. At this temperature an azeotropic mixture of water and normal octane distilled over. 56 parts of distillate were collected before all of the water appeared to have been distilled out. The mixture was then cooled to 120° C. and a reflux condenser was substituted for the azeotrope condenser. The solution was then again heated to reflux and 17.4 parts of 2,4-tolylene diisocyanate were added. The solution was agitated for 1½ hours at 125° to 127° C. Heating of the flask was then discontinued temporarily and 6.5 parts of water were added to the reaction flask. Heating was then resumed and the mixture was refluxed for an additional 30 minutes, during which time the solid reaction product began to separate. The mass was then cooled to 50° C. and the granules of the polymer were filtered off. The mass was worked on a rubber mill for about 10 minutes at 70° C. to remove the residual amounts of normal octane. 100 parts of this polymer were then compounded with 5 parts of the dimer of 2,4-tolylene diisocyanate on a rubber mill at 60° to 70° C. and cured in a press under pressure at 132° C. for about 1 hour. The elastic slab obtained from the press had the following properties: Tensile strength at the break 2700 pounds per square inch; elongation at the break 500%; and modulus at 300% elongation 400 pounds per square inch. The mol ratio of polytetramethylene ether glycol to diisocyanate to water in this example is 1:1.2:4.3.

*Example 11*

Into a flask fitted with an agitator, thermometer and an azeotropic distillation trap were placed 420 parts of normal octane which were heated to 70° C. and then 100 parts of polytetramethylene ether glycol of average molecular weight 3700 were added. Heating was continued with agitation until a boiling temperature of 127° C. was reached. At this temperature 56 parts of distillate were collected in the azeotrope trap and the solution appeared to be free of water. The flask temperature was then decreased to 115° C. and 13.2 parts of 2,4-tolylene diisocyanate were added. The temperature was maintained at 115° C. while agitation was continued for 1½ hours. The temperature was then reduced to 105° C. and 3 parts of water were added and agitation continued at this temperature for an additional hour; then 1.3 parts of piperidine were added and the reaction permitted to continue for 30 minutes. The reaction mixture was cooled to room temperature and the produce was removed by filtration. The addition of the piperidine stabilized the product so that premature curing would not take place. The product was then dried on a rubber mill for 30 minutes at 70° C. to remove any adherent or dissolved normal octane. Six weeks later the product was still curable and had not precured.

100 parts of the polymer were compounded with 10 parts of the dimer of 2,4-tolylene diisocyanate and cured at 132° C. for about 1 hour in a mold. The rubbery polymer obtained had the following properties: Tensile strength at the break 4300 pounds per square inch; elongation at the break 500%; and modulus at 300% elongation 1300 pounds per square inch. The ratio of polytetramethylene ether glycol to diisocyanate to water in this example is 1:2.8:6.2.

Where the polymers produced according to this invention contain free isocyanate groups they will tend to cure by the reaction of these free —NCO groups with reactive hydrogens, such as on —NHCONH—, present in the polymer. In order to store the polymer for any length of time it is necessary to add a stabilizer such as a basic nitrogen compound having only one nitrogen to which there is attached one replaceable hydrogen atom such as ammonia and salts such as ammonium carbonate hydrate which decompose under reaction conditions to yield ammonia; alkyl amines, either saturated or unsaturated, such as mono- or diethylamine, ni-butylamine, di-n-butylamine, diisobutylamine, and allylamine; aryl amines, such as aniline; aralkyl amines, such as benzylamine; mixed alkyl-aryl secondary amines such as N-methyl aniline; alicyclic amines, such as cyclohexylamine and dicyclohexylamine; heterocyclic nitrogen bases, such as piperidine, morpholine and ethyleneimine, as more particularly described in co-pending application of Nelson and Verbanc, Serial No. 305,912, filed August 22, 1952, now abandoned.

Acid-reacting compounds such as organic acid halides and inorganic acids, as more particularly described in co-pending application Serial No. 288,531, filed May 17, 1952, to Langerak, Prucino and Remington, now U. S. Patent 2,692,873, may be used to modify the reaction without departing from the spirit of the present invention. So also tertiary amine bases may be added to the reaction, as more particularly disclosed in co-pending application to Langerak, Serial No. 288,532, filed May 17, 1952, now U. S. Patent 2,692,874, to facilitate the reaction with water or other hydrogen chain extender.

The elastomers prepared by the method of this invention have many varied uses in common with other elastomers. From them may be prepared such articles of commerce as tires, inner tubes, belts, hose and tubing, wire and cable jackets, footwear, sponge, films, coated fabrics, a wide variety of molded articles, etc. These products are characterized by the advantageous properties of the elastomers of this invention such as resistance to the harmful effects of cold, heat, direct sunlight, oxygen and ozone, oil and other hydrocarbon solvents, water, mechanical abrasion, flexing, stretching and the like.

The basic elastomeric properties of the elastomers may be varied by suitable compounding. The amount and type of compounding agent incorporated in the stock is dependent upon the use for which the elastomer is intended. Included among some of the more important useful compounding agents are carbon black, clay, silica, talc, zinc and magnesium oxides, calcium and magnesium carbonate, titanium dioxide and plasticizers. Inorganic and organic coloring agents may be incorporated to give well defined colors since the natural color of the elastomer is a pale yellow or light amber.

The compounding agents may be mixed or incorporated with the product at the time of the incorporation of the vulcanizing diisocyanate. Conventional rubber processing machinery such as mills or Werner-Pfleiderer or Banbury mixers may be used. The resulting compounded stocks may be shaped and cured in conventional rubber industry equipment. Additionally, the stocks may be dissolved in or extended with appropriate solvents for application to surfaces and then cured thereon after evaporation of the solvent.

The general methods of use or application of the polymers of this invention are the same as those where the product is made in massive form, as more particularly disclosed in the Frederick B. Hill, Jr., application above mentioned.

I claim:

1. In the process of preparing elastomers by reacting a polytetramethylene ether glycol having a molecular weight of from 750 to 4000 with a molar excess of 2,4-tolylene diisocyanate and reacting the resulting isocyanate-terminated product with water, the step which comprises carying out said reactions in an inert aliphatic hydrocarbon solvent in which the resulting elastomer is insoluble, said solvent having from 6 to 12 carbon atoms.

2. In the process of preparing elastomers from polytetramethylene ether glycol having a molecular weight of from 750 to 4000 and a molar excess of 2,4-tolylene diisocyanate, the steps which comprise adding the polytetramethylene ether glycol to an inert aliphatic hydrocarbon solvent having from 6 to 12 carbon atoms, heating to eliminate any water that may be present, adding the 2,4-tolylene diisocyanate to form an isocyanate-terminated intermediate polymer with the polytetramethylene ether glycol, then adding water to convert the intermediate polymer into an elastomeric material, said solvent being one in which the resulting elastomeric material is insoluble.

3. In the process of preparing elastomers by reacting a polytetramethylene ether glycol having a molecular weight of from 750 to 4000 with a molar excess of 2,4-tolylene diisocyanate to form an isocyanate-terminated intermediate polymer and converting said intermediate polymer to an elastomeric material by reaction with water, the step which comprises carrying out the reaction of the intermediate polymer and the water in an inert aliphatic hydrocarbon solvent in which the resulting elastomer is insoluble, said solvent having from 6 to 12 carbon atoms.

4. In the process of preparing elastomers by reacting a polytetramethylene ether glycol having a molecular weight of from 750 to 4000 with a molar excess of 2,4-tolylene diisocyanate to form an isocyanate-terminated intermediate polymer and converting the said polymer to an elastomeric material by reaction with water, the steps which comprise carrying out said reactions in normal octane.

5. In the process of preparing elastomers by reacting a polytetramethylene ether glycol having a molecular weight of from 750 to 4000 with a molar excess of 2,4-tolylene diisocyanate to form an isocyanate-terminated intermediate polymer and converting the said polymer to an elastomeric material by reaction with water, the steps which comprise carrying out said reactions in normal heptane.

6. In the process of preparing elastomers by reacting a polytetramethylene ether glycol having a molecular weight of from 750 to 4000 with a molar excess of 2,4-tolylene diisocyanate and water, the step which comprises carrying out said reaction in an inert aliphatic hydrocarbon solvent in which the resulting elastomer is insoluble, said solvent having from 6 to 12 carbon atoms.

References Cited in the file of this patent

UNITED STATES PATENTS

| | | |
|---|---|---|
| 2,284,896 | Hanford et al. | June 2, 1942 |
| 2,511,544 | Rinke et al. | June 13, 1950 |
| 2,531,392 | Breslow | Nov. 28, 1950 |
| 2,726,219 | Hill | Dec. 6, 1955 |

FOREIGN PATENTS

| | | |
|---|---|---|
| 892,107 | France | Mar. 29, 1944 |